455-603 AU 233 EX

EIP8106 XR 3,789,653

United States Patent [19] [11] 3,789,653

Brejaud [45] Feb. 5, 1974

[54] SYSTEM FOR MEASURING TIME DIFFERENCES BETWEEN REMOTE CLOCKS AND FOR SYNCHRONIZING THE SAME

[75] Inventor: Hubert P. Brejaud, Sarcelles, France

[73] Assignee: Office National d'Etudes et de Recherches Aeropatiales, Chatillon, France

[22] Filed: May 30, 1972

[21] Appl. No.: 257,740

[30] Foreign Application Priority Data

June 8, 1971 France .............................. 7120636

[52] U.S. Cl. ......................... 73/6, 58/24 R, 250/199

[51] Int. Cl. ... G04b 17/12, G04c 11/00, H04b 9/00

[58] Field of Search ...... 73/6; 58/24 R, 35 R, 35 W; 250/199

[56] References Cited

UNITED STATES PATENTS

| | | | |
|---|---|---|---|
| 3,325,750 | 6/1967 | O'Hern et al. | 324/187 X |
| 3,541,552 | 11/1970 | Carlson | 58/24 R X |
| 3,722,258 | 3/1973 | Besson et al. | 73/6 |

FOREIGN PATENTS OR APPLICATIONS

| | | | |
|---|---|---|---|
| 160,464 | 1/1964 | U.S.S.R. | 73/6 |

*Primary Examiner*—Richard C. Queisser
*Assistant Examiner*—Frederick Shoon

[57] ABSTRACT

System for measuring the time difference between a master clock and a slave clock located respectively in two remote stations and synchronizing these clocks. It comprises, in the master clock station, a time base generator controlled by the master clock, a source of light, an electro-optical detector, control means depending upon the time base generator for switching on the light source and control means depending upon the electro-optical detector for switching off the light source. The slave clock station comprises a time base generator controlled by the slave clock, an electro-optical detector detecting light from the master clock station, a chronometer switched on by the time base generator and switched off by the electro-optical detector and another chronometer switched on and off respectively by the first and second output signal of the electro-optical detector. Means are provided in the slave clock station for partially receiving and partially reflecting the light to the electro-optical detector at the master clock station causing the light source to produce a luminous signal whose start and end are split by a duration equal to twice the light propagation round trip time between the two stations.

5 Claims, 6 Drawing Figures

SYSTEM FOR MEASURING TIME DIFFERENCES BETWEEN REMOTE CLOCKS AND FOR SYNCHRONIZING THE SAME

The present invention relates to a system for the accurate measurement of time differences between fixed or mobile remote clocks.

U.S. Pat. application Ser. No. 233,078 filed Mar. 9, 1972 in the names of Jean R. Besson and Jean R. Boillot and assigned to the same assignee as the present application, now U.S. Pat. No. 3,722,258 issued Mar. 27, 1973, has described a system whereby luminous pulses emitted at any given instant in a station with a primary or master clock are received by a receiver located in another station with an auxiliary or slave clock, then retransmitted by a reflector toward a receiver in the master clock station, and in which chronometers installed in the two stations near each of said master and slave clocks measure, on the one hand, the instant of luminous pulse occurrence in relation to the time defined by time base generators synchronized with each clock and, on the other hand, the round-trip propagation time of the luminous pulses.

However, system operation implies the comparison of measurements carried out within both stations, for instance through radio means, in order to calculate the time shift between the two clocks. This condition could prove awkward for some applications and would then represent a drawback.

More precisely, in the above U.S. Pat. application, the time shift to be measured was given by the equation :

$$t = \theta + \tau_p - t_1 \quad (1)$$

wherein :

$\theta$ is the delay time between a pulse of the time base generator controlled by the master clock and the instant of emission of the luminous pulse;

$\tau_p$ is half the round trip propagation time;

$t_1$ is the delay time between a pulse of the time base generator controlled by the slave clock and the instant of reception of the luminous pulse:

The quantities $\theta$ and $2\tau_p$ were available in the master clock station and the quantity $t_1$ was available in the slave clock station.

In the present invention the luminous pulse source is directly controlled by the time base generator controlled by the master clock, thus making $\theta$ equal to zero whereby equation (1) becomes $$t = \tau_p - t_1 \quad (2)$$

and the terms $\tau_p$ and $t_1$ are both available in the slave clock station.

The present invention alleviates the disadvantage above-mentioned while offering a system that is just as accurate.

The system according to the invention comprises, on the one hand, within the master clock station, a light transmitter source of luminous signals, a laser for good advantage, a shutter for the source light, a receiver with an electro-optical detector which is sensitive to said luminous signals, a first time base generator synchronized with said master clock, and on the other hand, within the slave clock station, a second receiver comprising an electro-optical detector sensitive to said luminous signals, a reflector, a second time base generator synchronized with said slave clock, a first chronometer measuring the time difference between the received luminous signals and the pulses of the second time base generator, and a second chronometer measuring the duration of said received luminous signal.

The luminous signal emitted from the master clock station can be a continuous pulse whose duration is equal to the light roundtrip propagation time between the two stations. Instead it can be formed of two extremely short luminous pulses with respective leading edges corresponding to the leading edge and trailing edge, respectively, of said continuous pulse. The luminous signal transmitter is then an intermittent source of light such as generated by a triggered laser, a photoluminescent diode, or a continuous laser which would include an electro-optical modulator built within its structure, said source being able to produce intense pulsating luminous signals so as to increase the range of said invention system.

This invention will be better understood in the light of the following description and by following the attached drawings, wherein.

Figure 1:
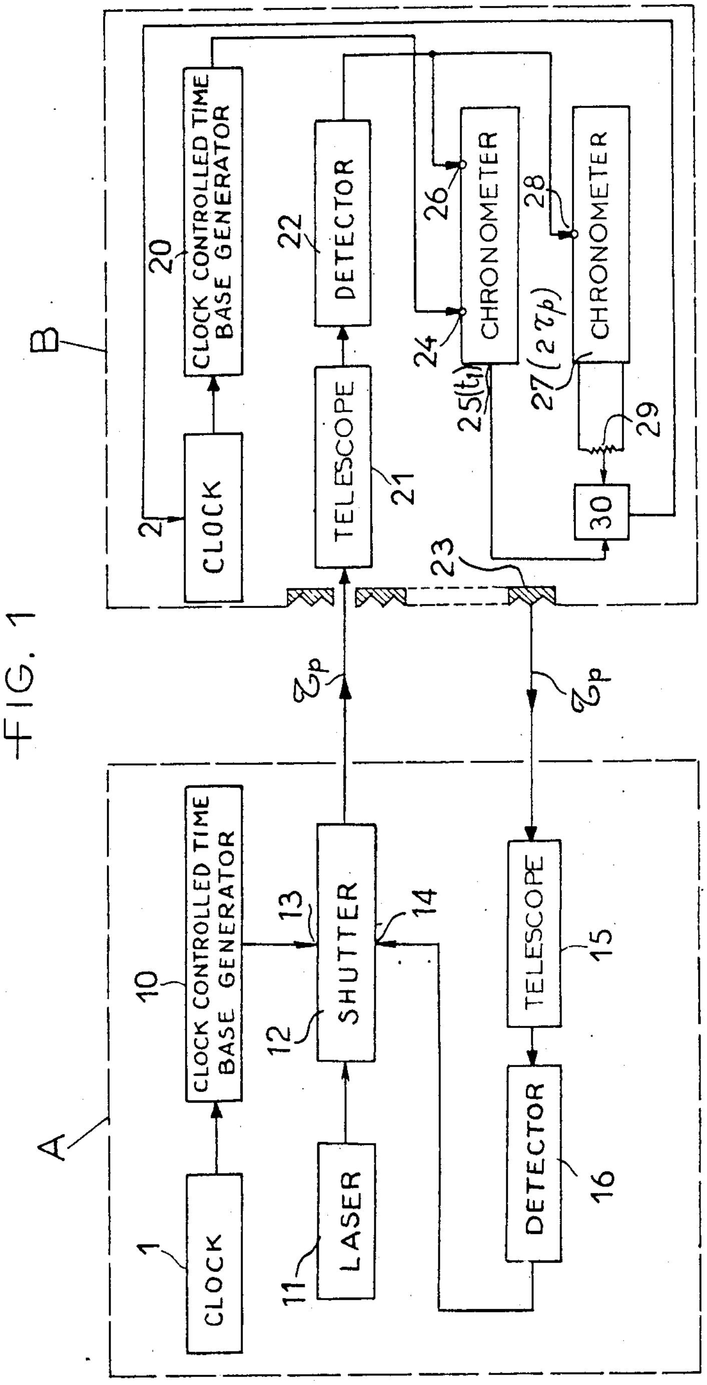
FIG. 1 represents a form of embodiment of a device as per the invention.

In FIG. 1, the stations where are located the two clocks 1 and 2 are represented by the dotted rectangles A and B. Station A is mobile while station B is fixed.

Clocks 1 and 2 are nuclear transition clocks; clock 1 is the master clock while clock 2 is the slave clock.

A time base generator 10 controlled by the master clock 1 generates electric pulses at the frequency of 10 per second. A source of continuous light 11, for instance a carbon dioxide laser, and a short response time shutter 12 represent the luminous signal transmitter directed toward the slave clock station. Shutter 12 is, for instance, an electro-optical shutter which includes a POCKELS cell and its inputs 13 and 14 enable to control free flow or masking of laser light, respectively, by means of electrical pulses.

A telescope 15 and an electro-optical detector 16 represent the receiver which is sensitive to reflected laser light.

The slave clock 2 drives a time base generator 20 which generates 10 electrical pulses per second. A telescope 21 and an electro-optical detector 22 form a receiver for emitted luminous signals. Reflector 23, built of trihedral optical elements for good advantage, reflects the luminous signal toward the master clock station.

The "ON" input 24 of a first chronometer 25 is connected to the output of the time base generator 20, input "OFF" 26 of said chronometer being connected to the output of the electro-optical detector 22. A second chronometer 27 is connected by its input 28 to the electro-optical detector 22. The two chronometers 25 and 27 are of the type operated through electric pulse signals by means of two separate inputs for the chronometer 25 and by means of a single input for chronometer 27.

Device operation is as follows : a pulse of time base generator 10 controls shutter 12 opening to allow the luminous signal to go through, the leading edge of said signal being in synchronism with the pulse of the time base generator.

The luminous signal is received through the telescope 21 on detector 22 with a $\tau_p$ delay due to propagation. An electric signal appears at the output of the detector 22 and controls on one hand chronometer 25 stoppage which has received startup pulses from the time base generator 20, and on the other hand chronometer 27 startup.

The luminous signal is bounced back by reflector 23 and received on detector 16 through telescope 15 with a new $\tau_p$ delay due to propagation. At detector 16 output, an electric signal develops which has for effect to control the closing of shutter 12.

The luminous transmission is then interrupted, the detector 22 output signal disappears, generating chronometer 27 stoppage.

Figure 2:
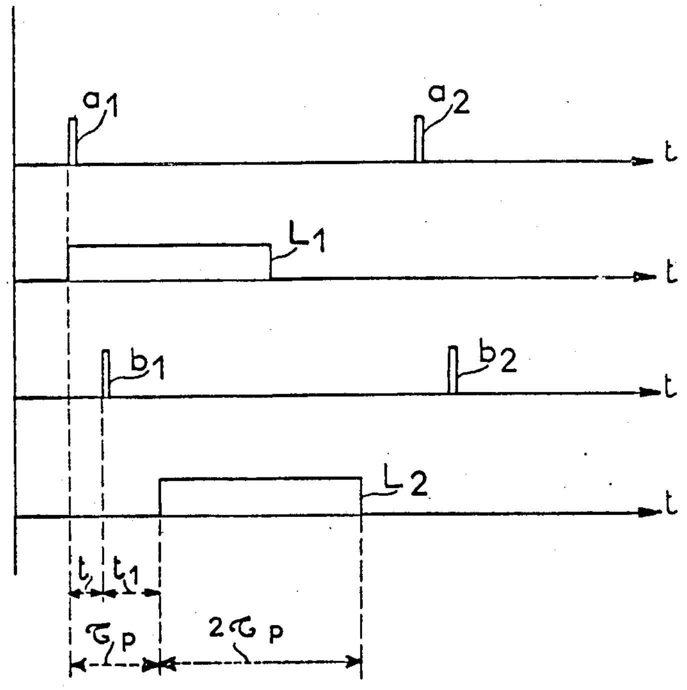
FIG. 2 shows a time sequence illustrating the operation of the device depicted in FIG. 1.

On FIG. 2, the master clock time base generator 10 electric pulses are shown as $a_1$, $a_2$, and the emitted luminous signal is shown as $L_1$. The slave clock time base generator 20 pulses are shown as $b_1$, $b_2$, with the assumption that they have a time delay $t$ on pulses $a_1$, $a_2$, and the luminous signal received near the slave clock is shown as $L_2$; $t_1$ represents the time measured by chronometer 25 which starts by means of a pulse of time base generator 20 and stops when detector 22 develops an electric signal in response to the luminous signal, said time $t_1$ being equal to the time difference between the instant of generation of a pulse by the time base generator 10 delayed by propagation time $\tau_p$ and the instant of generation of a pulse by the time base generator 20. $2\ \tau_p$ represents the measurement carried out by chronometer 27, in other words the duration of the luminous signal. FIG. 2 shows that time shift $t$ of the slave clock in relation to the reference clock is given by the relation (2). Knowledge of shift $t$ enables to reset slave clock time in relation to the master clock.

In general, said invention implementation calls upon a series of measurements as the luminous signal transmitter produces a series of signals in synchronism with the successive pulses of the time scale 10. Thus, there is the need to provide circuits, not shown in FIG. 1, in order to control memory storage of measures carried out by the chronometers and their zero resetting before each new measurement.

Figure 3:
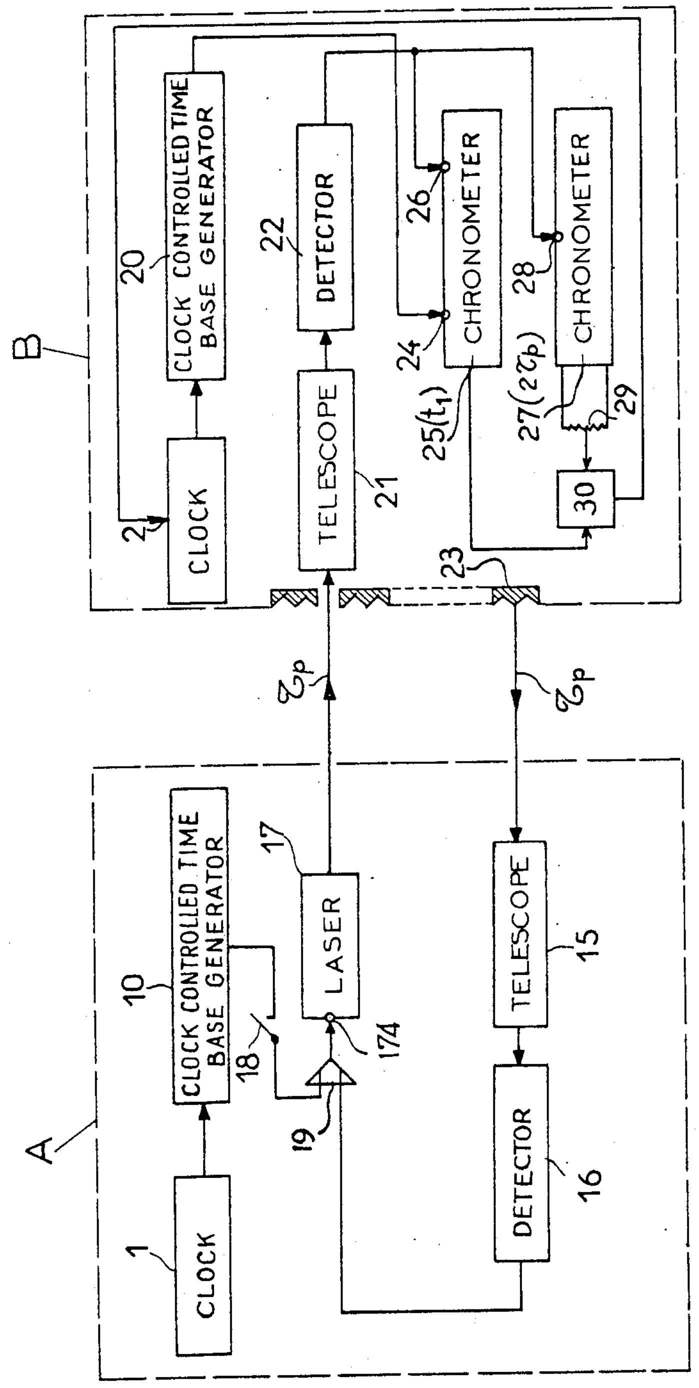
FIG. 3 shows another form of embodiment of a device according to the invention.

In FIG. 3, blocks A, B, 1,2, 10, 15, 16, 20, 21, 22, 25, 27, define the same stations and the same component assemblies as in FIG. 1. The light source 11 is replaced by a source 17 of another kind.

The luminous signal emitter directed toward station B is a ruby laser 17. A transmission control system 18 enables to dispatch a pulse of time base generator 10 to control the triggering of ruby laser 17.

System operation as shown in FIG. 3 is as follows :

In order to emit a luminous signal, control switch 18 is shorted out for a split second and the first time base generator pulse which appears triggers laser 17. The luminous signal emitted in response to this pulse is a very short luminous pulse received through telescope 21 on detector 22 with a delay of $\tau_p$ due to propagation. An electric signal develops at the output of detector 22 and controls on the one hand chronometer 25 stoppage, receiving otherwise startup pulses issued from time base generator 20, and on the other hand, chronometer 27 startup.

The luminous signal is bounced back by reflector 23 and received by detector 16 through telescope 15 with a new $\tau_p$ delay. An electric signal develops at the output of detector 16 and it has for effect to trigger the ruby laser 17 a second time through the OR 19 gate. This second extremely short luminous pulse is received by telescope 21 of station B and detector 22 generates an electric pulse to stop chronometer 27.

Figure 4:
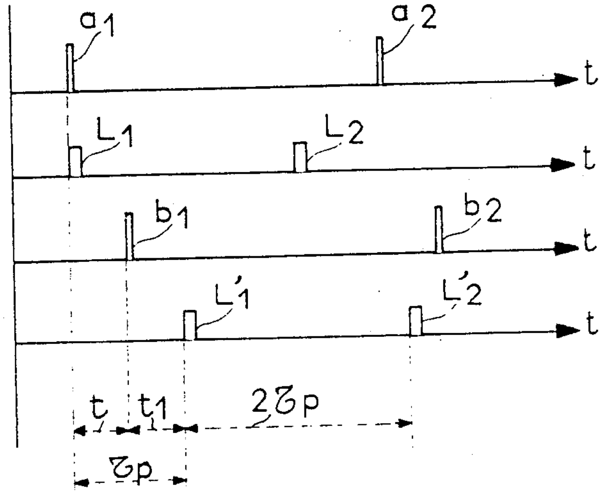
FIG. 4 shows a time sequence depicting the operation of the device of FIG. 3.

In FIG. 4, the pulses produced by time base generator 10 are shown at $a_1$, $a_2$, the emitted luminous pulse in synchronism with a time base generator pulse is shown at $L_1$ and the return luminous pulse is shown at $L_2$. The pulses of time base generator 20 are shown as $b_1$, $b_2$, being delayed by time $t$ with respect to pulses $a_1$, $a_2$, and the luminous signals received at station B are shown at $L_1'$, $L_2'$, respectively; $t_1$ represents the time measured by chronometer 25 which starts by means of a pulse of time base generator 20 and stops when detector 22 electric signal appears in response to luminous signal $L_1'$; $t_1$ is therefore equal to the time interval separating the instant of generation of a pulse by time base generator 10 of the master clock 1 delayed by propagation time $\tau_p$ and the occurrence instant of a pulse in time base 20. $2\ \tau_p$ represents the value measured by chronometer 27, in other words the time interval separating the leading edges of the two light pulses of laser 17. FIG. 4 shows that the slave clock time shift in relation to the master clock is always given by the relation (2).

In FIG. 3, the light pulse emitter is a triggered laser and it is known in this respect that the triggering delay in relation to the control pulse instant is function of the rotary prism rotational velocity. A laser of such type would therefore be suitable for measurements with an overall sought after accuracy in the order of 1 millisecond.

Whenever higher accuracy is desired, the light signal transmitter should preferably be an electroluminescent diode or better still a continuous laser able to emit extremely short pulses on control, in other words a laser comprising a built-in electro-optical modulator.

Figure 5:
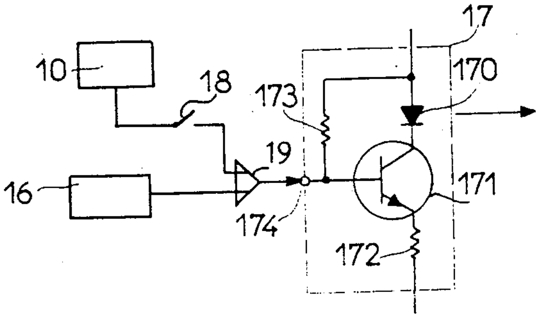
FIG. 5 represents a light source used for the device of FIG. 3.

FIG. 5 shows the schematic diagram of such luminous signal transmitter.

The electroluminescent diode 170 is incorporated in a chain which includes a transistor 171 and a resistor 172 and is connected to a current source terminal that is not shown. The resistor 173 is used to bias the base of transistor 171. The emission control device 18 and the detector 16 are connected to input 174 of transmitter 17 of luminous signals through OR gate 19.

The operation is as follows : The shut-off of switch 18 causes generation of a pulse by time base generator 10 on input 174. Transistor 171 is turned on during said pulse duration and the electro-luminescent diode 170 emits a luminous pulse in synchronism with the pulse of time base generator 10. The leading edge of pulses emitted by known electroluminescent diodes is very steep, and this enables to reach an overall accuracy in the order of 1 nanosecond on such measurements.

The luminous signal emitter can also be formed by a continuous laser, for example a carbon dioxide laser comprising as a built-in element an electro-optical modulator, for instance of the type known under the name of "ELECTRO-OPTIC MODULATOR," manufactured by LASERMETRIX. It is known that such unit enables to obtain a powerful, short and having a well-defined occurence instant developed luminous pulse through power accumulation effect from a continuous laser.

Figure 6:
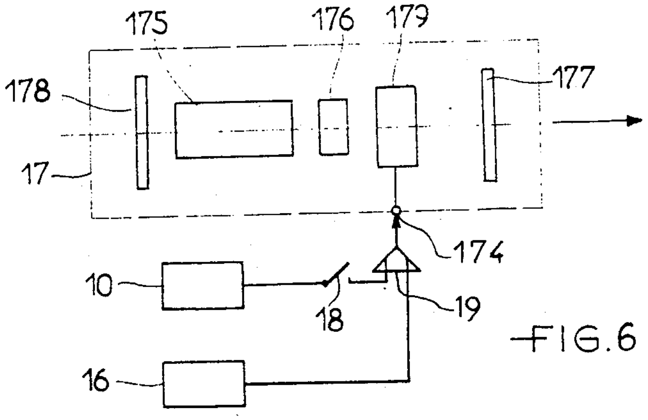
FIG. 6 represents another source of light used for the device of FIG. 3.

FIG. 6 shows this type of luminous signal transmitter which includes the laser bar 175, a polarizer filter 176, a first and second mirror 177 and 178, an electro-optical modulator 179 linked to input 174. The transmission control system 18 and the electro-optical detector 16 are connected to input 174 of luminous signal transmitter 17 through OR gate 19.

The light beam emitted spontaneously by bar 175, driven by a flashlamp — not shown — passes through the polarizer filter 176 which imparts it such polarization that at the output, beam polarization is vertical, for instance. The beam goes through modulator 179 which rotates the polarization axis by 45°, and is then reflected on mirror 177, then again goes through the modulator 179 where its polarization axis rotates again by 45° and is finally reflected on polarizer filter 176. Consequently, power oscillation within the cavity resonator formed by the exposed facings of said polarizer 176 and modulator 179 takes place. The short duration control pulse developed on input 174 causes modulator 179 opening and laser amplified beam passage through mirror 177.

The leading edge of the pulses emitted with this device are extremely steep and enable to reach an overall accuracy of 1 nanosecond on measurements. Chronometer 25 generates an output voltage that is proportional to $t_1$ and chronometer 27 generates a voltage that is proportional to 2 $\tau_p$. This last voltage is divided by two in the amplitude divider 29 (simple potentiometer). Then the two voltages, proportional to $t_1$ and $\tau_p$ are applied to subtracter 30 with its output connected to clock 2.

What I claim is :

1. A system for measuring the time difference between a master clock and a slave clock located respectively in two remote stations and synchronizing said clocks comprising, in the master clock station, a first time base generator controlled by said master clock, a source of light, a first electro-optical detector, control means depending upon said first time base generator for switching on said light source, control means depending upon said first electro-optical detector for switching off said light source, and, in the slave clock station, a second time base generator controlled by said slave clock, a second electro-optical detector, a first chronometer switched on by said second time base generator and switched off by said second electro-optical detector, a second chronometer switched on and off respectively by the first and second output signal of said second electro-optical detector, means for reflecting to said master clock station the light received therefrom, whereby the light source produces a luminous signal whose start and end are split by a duration equal to twice the light propagation time between the two stations.

2. A system for measuring the time difference between a master clock and a slave clock located respectively in two remote stations and synchronizing said clocks according to claim 1 in which the light source is a continuous laser and the switching-on and switching-off control means is a shutter means associated with said continuous laser, whereby the light source produces a luminous pulse whose duration is equal to twice the light propagation time between the two stations.

3. A system for measuring the time difference between a master clock and a slave clock located respectively in two remote stations and synchronizing said clocks according to claim 1 in which the light source is a CW laser and the switching-on and switching-off control means is a modulator associated with said pulse laser, whereby the light source produces a start luminous pulse and an end luminous pulse whose time separation is equal to twice the light propagation round trip time between the two stations.

4. A system for measuring the time difference between a master clock and a slave clock located respectively in two remote stations and synchronizing said clocks according to claim 1 in which the light source is an electroluminescent diode and the switching-on and switching-off means is a modulator associated with said electroluminescent diode, whereby the light source produces a start luminous and an end luminous pulse whose time separation is equal to twice the light propagation time between the two stations.

5. A system for measuring the time difference between a master clock and a slave clock located respectively in two remote stations and synchronizing said clocks according to claim 1 in which the light source is a Q-switched cavity resonator continuous laser and the switching-on and switching-off control means is a means for switching the Q of said cavity resonator, whereby the light source produces a start luminous and an end luminous pulse whose time separation is equal to twice the light propagation time between the two stations.

* * * * *